(12) United States Patent
DeCoster

(10) Patent No.: US 6,750,427 B1
(45) Date of Patent: Jun. 15, 2004

(54) CONTROLLED WELDING OUTPUT WITH FUSED ELECTRODE DETECTION

(75) Inventor: Albert J. DeCoster, Kaukauna, WI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/065,887

(22) Filed: Nov. 27, 2002

(51) Int. Cl.$^7$ ................................................ B23K 9/10
(52) U.S. Cl. ................................ 219/130.21; 219/125.1
(58) Field of Search ................. 219/130.21, 124.03, 219/124.34, 125.1, 130.01, 137.2, 137.71

(56) References Cited

U.S. PATENT DOCUMENTS

| | | | |
|---|---|---|---|
| 2,617,913 A | 11/1952 | Oestreicher | |
| 2,912,565 A | * 11/1959 | Lund | 219/124.03 |
| 4,044,413 A | 8/1977 | Tucker | |
| 4,100,390 A | 7/1978 | Jackson | |
| 4,435,631 A | 3/1984 | Drouet et al. | |
| 4,570,340 A | 2/1986 | Shaw | |
| 4,570,842 A | 2/1986 | Gregorious et al. | |
| 4,766,826 A | 8/1988 | Block | |
| 4,943,701 A | 7/1990 | Nakajima et al. | |
| 4,952,773 A | * 8/1990 | Orsos et al. | 219/124.34 |
| 5,245,546 A | 9/1993 | Iceland | |
| 5,308,952 A | 5/1994 | Bunker et al. | |
| 5,343,016 A | 8/1994 | Davis et al. | |
| 5,412,175 A | * 5/1995 | Shimogama | 219/125.1 |
| 5,513,093 A | 4/1996 | Corrigall | |
| 5,714,731 A | 2/1998 | Ulrich et al. | |
| 6,034,350 A | 3/2000 | Heraly et al. | |
| 6,115,051 A | 9/2000 | Simons et al. | |
| 6,115,273 A | 9/2000 | Geissler | |
| 6,156,998 A | 12/2000 | Takahashi et al. | |

FOREIGN PATENT DOCUMENTS

JP 01-031574 A * 2/1989

OTHER PUBLICATIONS

Millermatic 251 and M–25 Gun Owner's Manual, Miller Electric Manuracturing Company, Appleton, WI.

* cited by examiner

Primary Examiner—Clifford C. Shaw
(74) Attorney, Agent, or Firm—Ziolkowski Patent Solutions Group, LLC

(57) ABSTRACT

The present invention is directed to a method and apparatus of controlling the output of a welding power source with a fused electrode detection circuit. The present invention incorporates a fused electrode detection circuit to regulate the output of the welding system power source. By providing feedback as to when the electrode begins to stick in the weld, the output of the power source may be regulated to allow easy diffusing of the electrode. That is, by reducing the output of the power source upon detection of a fused electrode condition, a user or technician can remove or unstick the electrode from the weld without having to shut down the power source or without forcefully removing it while power is on and creating large, damaging arcs. By limiting the output of the power source until the electrode is "unstuck", the present invention reduces the likelihood of damaged electrodes, electrode holders, and welds. The invention provides easy diffusing of the electrode and allows quick return to welding.

20 Claims, 4 Drawing Sheets

CONTROLLED WELDING OUTPUT WITH FUSED ELECTRODE DETECTION

BACKGROUND OF INVENTION

The present invention relates generally to welding and, more particularly, to a method and apparatus of controlling output of a welding power source with fused electrode detection.

Welding is a common process to join, combine, or reinforce materials in automotive and industrial environments. The particular welding process chosen depends a great deal on the objective and the products to be joined. For example, stick welding or Shielded Metal Arc Welding (SMAW) is an arc welding process that uses a consumable electrode and may be used with either an AC or DC output. Tungsten Inert Gas (TIG) is another type of welding process and uses a tungsten electrode that does not become part of the completed weld. Both stick and TIG welding, as well as other welding processes, utilize an electrode to create a voltage potential across a welding area.

An electrode is used in the welding process to initiate and maintain a welding arc. For example, in stick welding, the user typically scratches or touches the electrode to a workpiece to begin the welding process. If the open circuit voltage of the power source is sufficient, an arc will be created between the electrode and the workpiece as the user pulls the electrode away from the workpiece. If the electrode is pulled too far from the workpiece, too fast, the voltage necessary to make the arc may not be obtainable and the welding process is not initiated. Conversely, the welding process will continue as long as the open circuit threshold is not exceeded. That is, a "short" is detected and maintained at the weld. This "short" condition is not a true short as a minimal voltage potential exists between the electrode and the workpiece. A "true short" would occur when there is not a voltage potential or drop between the workpiece and electrode. Typically, as long as the threshold is not exceeded (i.e. the "short" is maintained), the power source is said to be in a welding state.

During a welding process, if the electrode comes in contact with the workpiece for any more than a brief moment, the voltage potential between the workpiece and the electrode drops and a true short condition is experienced. When this occurs, the electrode becomes fused, or welded directly to the workpiece, and once stuck, is difficult to remove.

A number of controls have been developed that advantageously address disabling the welding output if the open circuit threshold is exceeded. Notwithstanding the advances made in arc-ending detection, there remains a need to control the output of a welding power source based on a fused electrode condition.

Sticking of the electrode to the weld of a workpiece is undesirable for a number of different reasons. For example, if the electrode sticks in the weld, the electrode melts very rapidly and becomes one with the weld. An operator must then twist and turn the electrode to break the electrode from the weld. This not only detracts from the quality of the weld, but also can rapidly consume or destroy the electrode and/or create arcing between the electrode and the electrode holder. This arcing can damage not only the electrode, which in many cases is a consumable, but worse, damage the holder of the electrode. If too much of the electrode is lost due to a fused electrode, the electrode must be replaced. Moreover, an excess amount of electrode consumed in a weld may result in the operator having to grind the weld and restart the weld process anew. Worse, that which was the subject of the welding may also be damaged and in need of replacement. Damage to the electrode and the object welded results in a longer welding process and increased welding/product costs.

It would therefore be desirable to design a system for controlling the output of a welding power source having early fused electrode condition detection. It would also be desirable to implement a fused electrode detection scheme with an arc ending detection circuit to provide a more robust controlled power source.

BRIEF DESCRIPTION OF INVENTION

The present invention is directed to a method and apparatus to control the output of a welding power source having a fused electrode detection circuit overcoming the aforementioned drawbacks. The present invention incorporates a fused electrode detection circuit to regulate the output of the welding system power source. By providing feedback as to when the electrode is stuck in or to the weld, the output of the power source may be regulated to provide a stable environment. By reducing the output of the power source upon detection of a fused electrode condition, the present invention allows a user or technician to quickly remove or un-stick the electrode from the weld. The invention also allows the electrode to be "unstuck" with ease by limiting the output of the power source until the electrode is "unstuck".

Therefore, in accordance with one aspect of the present invention, a welding power supply comprising a source of power and a controller connected to the source of power. The power supply includes an output feedback circuit connected to the controller wherein the controller is configured to receive a signal indicative of a fused electrode condition at a welding area and automatically reduces output of the source of power upon receipt of the signal.

In accordance with another aspect of the present invention, a controller is configured to regulate output of a welding power source. The controller includes an output feedback circuit configured to provide a signal indicative of an output condition at a welding area and a control circuit connected to the output feedback circuit. The control circuit is configured to regulate output of the welding power source based on the signal provided by the output feedback circuit. The control circuit is further configured to automatically reduce the output of the welding power source upon receipt of a fused electrode condition signal from the output feedback circuit.

In accordance with a further aspect of the present invention, a computer readable storage medium having a computer program stored thereon is designed to regulate a welding power source. The computer program includes a set of instructions that when executed by a processor causes the processor to receive an input indicating an output condition at a welding area and determine from the input if an electrode is becoming fused in a weld. If such an electrode condition is determined, the computer program causes the processor to automatically output a command signal to the welding power source to reduce power output to a prescribed level until an input indicates a free electrode condition.

According to a further aspect of the present invention, a welding power supply includes means for providing power suitable for welding and means for controlling the means for providing power that is connected to the means for providing power. The power supply further includes means for providing feedback of a welding area. The means for providing feedback is connected to the means for controlling. The welding power supply also includes means for reducing an output of the means for providing power based on reception of a signal from the means for providing feedback of an electrode sticking at the welding area.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
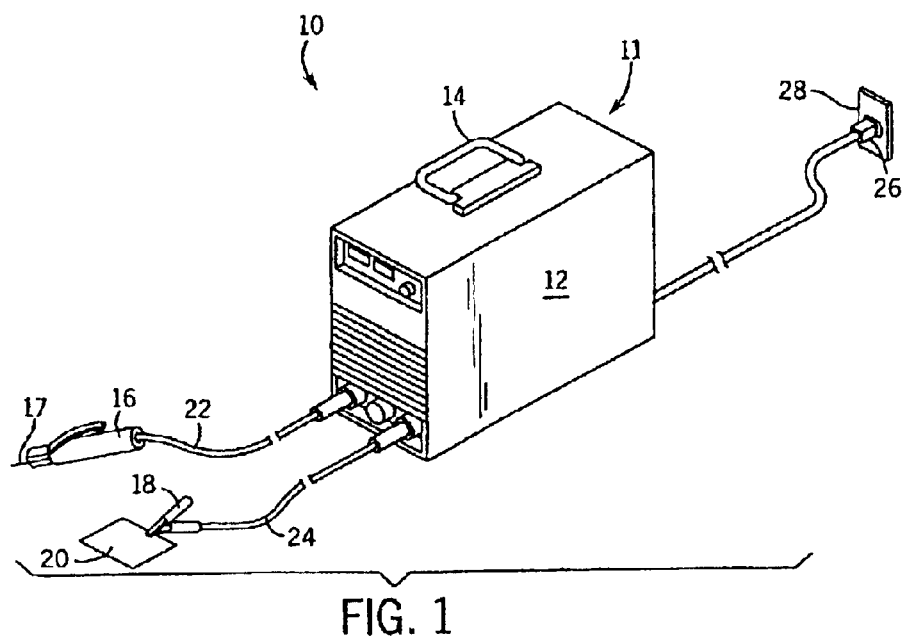
FIG. 1 is a perspective view of a welding system incorporating the present invention.

Referring now to FIG. 1, a perspective view of a welding device 10 incorporating the present invention is shown. Welding device 10 includes a power source 11 defined by housing 12 enclosing the internal components of the welding device 10. Optionally, the power source 11 includes a handle 14 for portability. To effectuate the welding process, an electrode clamp 16 having an electrode 17 as well as a clamp 18 is connected to the power source. The electrode 17 may be of a consumable type for stick welding applications or made of tungsten for TIG welding applications. Clamp 18 is configured to hold and/or ground a workpiece 20 to be welded. As is known, when electrode clamp 16 is in relative proximity to workpiece 20, a welding arc results. Connecting the electrode clamp 16 and clamp 18 to the housing 12 is a pair of electrical cables 22 and 24, respectively.

As indicated previously, housing 12 forms an enclosure having therein a plurality of electrical components. The housing and components collectively form a power source for the welding device. The power source conditions raw power received from a utility line power supply, or from an engine driven power supply, and conditions that power for use by the welding application. As such, welding device 10 includes power cable 26 that provides power to the plurality of electrical components within housing 12 from a line power supply 28. Alternatively, cable 26 may be connected to an engine driven power supply, battery, or other power supplying system.

Power sources must convert a power or voltage input to a necessary or desirable power output tailored for a specific application. For example, in a welding application, the power source typically receives a high voltage (230/240 volt) alternating current (VAC) signal and provides a high current output welding signal. Moreover, the input sources may be single-phase or three-phase. Welding power sources receive the power input and produce approximately 10–40 VDC high current welding output. For some applications, it is desirable for the power source to output a power signal at a voltage level greater than the input voltage level. In these applications, a step-up transformer is commonly used. To further maximize the output voltage of the power source, the transformer may include a boost winding.

The heretofore described power source is only one example of an application in which the present invention may be applicable. One exemplary power source is the Maxstar® series of power sources marketed by the Miller Electric Manufacturing Company of Appleton, Wis. Maxstar® is a registered trademark of Miller Electric Manufacturing Company. However, the present invention is applicable with many other power sources.

Figure 2:
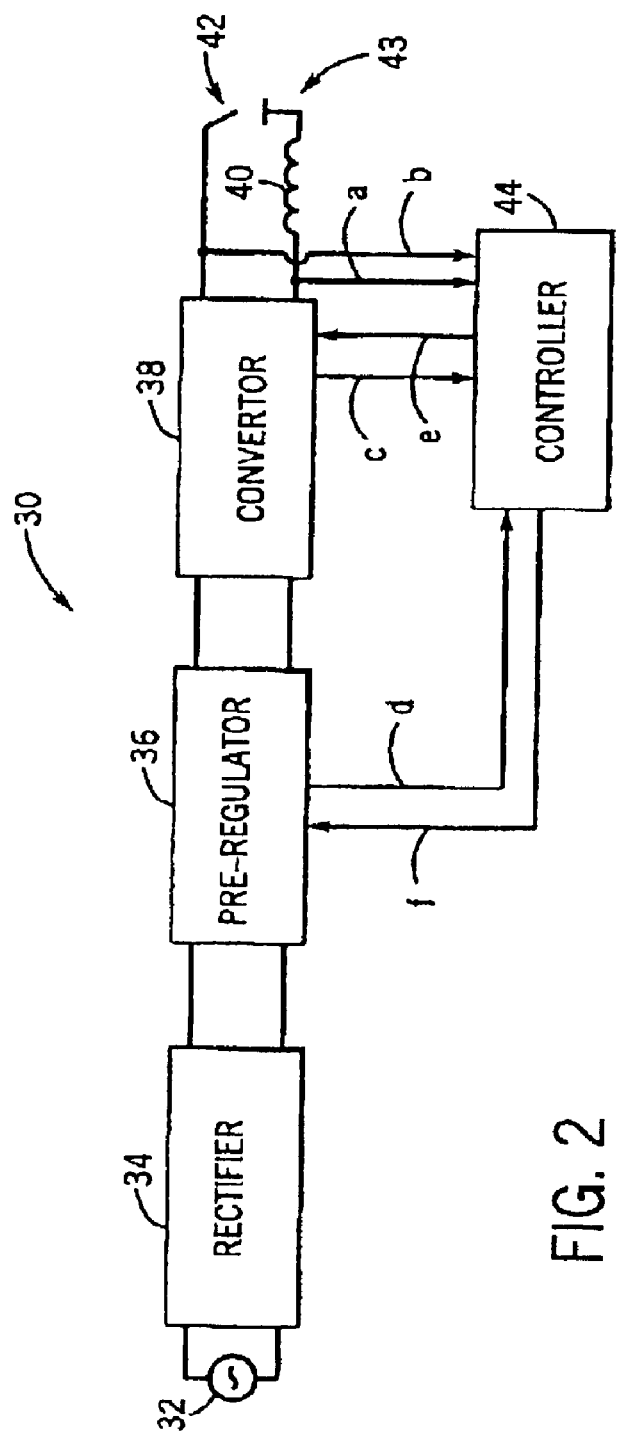
FIG. 2 is a schematic block diagram of a welding power source for use with the present invention.

A block diagram of a welding power supply constructed in accordance with the preferred embodiment is shown in FIG. 2. Power supply 30 receives input voltage 32 to provide power to the welding power supply. The input voltage is typically between 90 and 480 volts, and is provided to a rectifier 34, which may be a simple bridge rectifier. The output of rectifier 34 is a rectified sinusoid. A pre-regulator 36 receives the rectified sinusoid from rectifier 34 and provides a DC bus output to an output inverter 38. Pre-regulator 36, in a preferred embodiment, is a soft-switched boost converter which provides close to unity power factor. Other converter or inverter configurations may equivalently be employed. Converter 38 is preferably a half-bridge transformer with an isolated, soft switched inverter. Output converter 38 is preferably a typical forward converter. Other alternatives include using different power sources or power topologies, omitting the pre-regulator or the output converter, using a transformer based power supply, a phase control based power supply, or any other type of power supply. Power source, or source of power, as used herein includes power circuitry such as rectifiers, switches, transformers, SCRs, etc. that process and provide output power.

Controller 44 receives an output feedback signal a, b as an input. The output feedback signal a, b may include voltage, current, power, or functions thereof (derivatives, integrals, etc.). Controller 44 also receives signals c, d from converter 38 and pre-regulator 36, respectively, and provides control signals e, f thereto, respectively. An inductor 40 is in series with a workpiece that together with an electrode 42 form a welding area 43.

Figure 3:
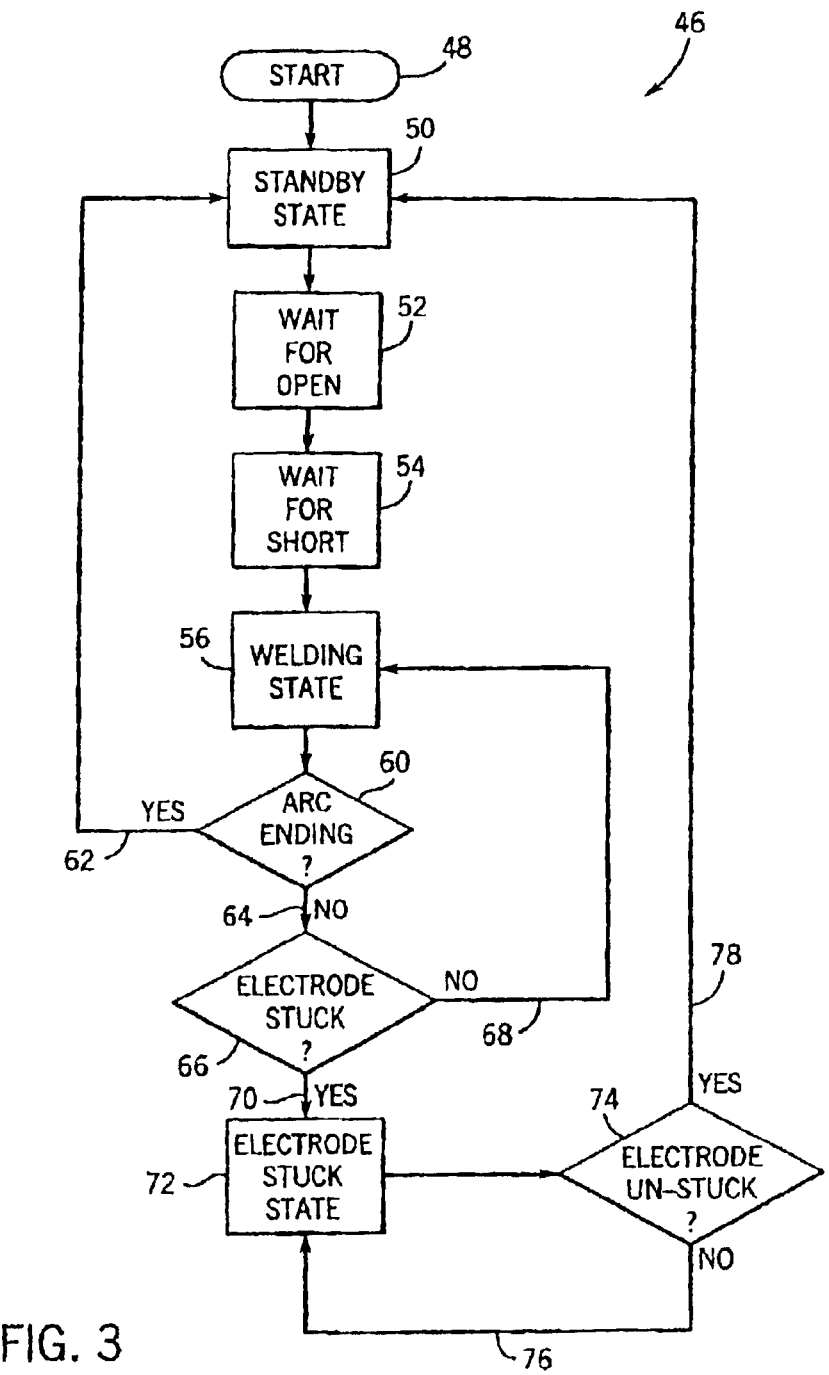
FIG. 3 is a flow chart setting forth the steps of a process of regulating a welding power source in accordance with the present invention.

Referring now to FIG. 3, a flow chart implementing the present invention is shown. The process of FIG. 3 implements an open detection circuit as well as a fused electrode detection circuit to control welding output. Process 46 starts at step 48, and at step 50, the power supply is controlled to be in a standby state which is defined a having a reduced open circuit voltage and a disabled converter. Standby state, as used herein, includes a state where the output voltage and/or current of the welding power supply is reduced, and/or features relating to current, power, or voltage, such as boosts or user setpoints are disabled and/or the inverter portion of the power supply may be turned off. When placed into standby state, the controller for the power source imitates a low voltage detection scheme that senses the operating condition at the output. This "sense voltage" is used to provide feedback as to whether an open condition or a "short" condition is present at the weld.

Process 46 also includes a wait-for-open step 52. That is, the welding process is regulated by the first detection of an open condition at the welding area. Process 46 will remain at step 52 until an open condition is detected. As such, a welding output is prevented until an open condition is detected. Once an open condition is detected 52, the process then waits for detection of a welding short at the welding area 54. As was previously described, this "short" refers to a minimal voltage potential between the electrode and the workpiece to commence welding. Such a "welding shorts" as referenced here does not include a "true short" as a "true short" refers to a condition where there is no voltage potential or drop between two points of reference (i.e., electrode and workpiece). If a short is not detected at 54, the process remains in a hold or wait state and continues until a welding short is detected. If a welding short is detected at step 54, the power supply is controlled to be in the welding state at step 56, with a full open circuit voltage, and controlled in accordance with a user set-point (i.e., fully on). Welding state as used herein includes a state where the output voltage and/or current of the welding power supply is provided at the output setpoint such that welding can be performed and/or features relating to current, power, or voltage, such as boosts or user setpoints, are enabled, and/or the inverter portion of the power supply may be turned on, but usually excludes a preheat state. Additionally, in the welding state, the sense voltage detection is preferably automatically disabled. Once initiated, the power supply continues in a welding state until the user desires to end the arc by pulling the electrode away from the workpiece 60 or it is determined that an electrode is stuck.

If an arc ending is detected at 60, 62, then the power source is controlled to return to the condition realized in the standby state 50. Alternately, the power source could be returned to the wait-for-open state 52. By returning to step 50 or 52 and waiting for an open condition, the inadvertent re-striking of the arc is prevented. Simply, the user will not be able to restart welding at the welding area until an open condition is detected at the welding area. If the arc is not detected as ending 60, 64, the process continues in the welding state and looks for a fused electrode condition 66. If a fused electrode condition is not detected 66, 68, the process returns to step 56 and maintains the output of the power source in a welding state. However, if an electrode sticking condition signal is received 66, 70, the welding power source is placed in a fused electrode state 72.

The fused electrode state 72 is defined by a disabling of the welding output and a re-initialization of the sense voltage detection scheme. By automatically disabling the welding output voltage, the electrode will not become solidly fused and the user may easily un-stick the electrode from the weld. By re-initializing the sense voltage detection, the appropriate control signals may be provided to the controller indicating when the electrode has been "unstuck". The sense voltage is an extremely low voltage and therefore will not hinder diffusing the electrode from the weld and would not have any harmful effects when the user tries to physically remove the electrode from the weld. The fused electrode state 72 will remain active until an electrode-unstuck signal is received. As such, process 46 continues at step 74 to determine if the electrode has been removed from the weld. If not 74, 76, process returns to step 72 and maintains the welding power source in a fused electrode state. If an electrode unstuck condition signal is received 74, 78, the power source is returned to a standby state at step 50 and awaits restarting of the welding process.

Figure 4:
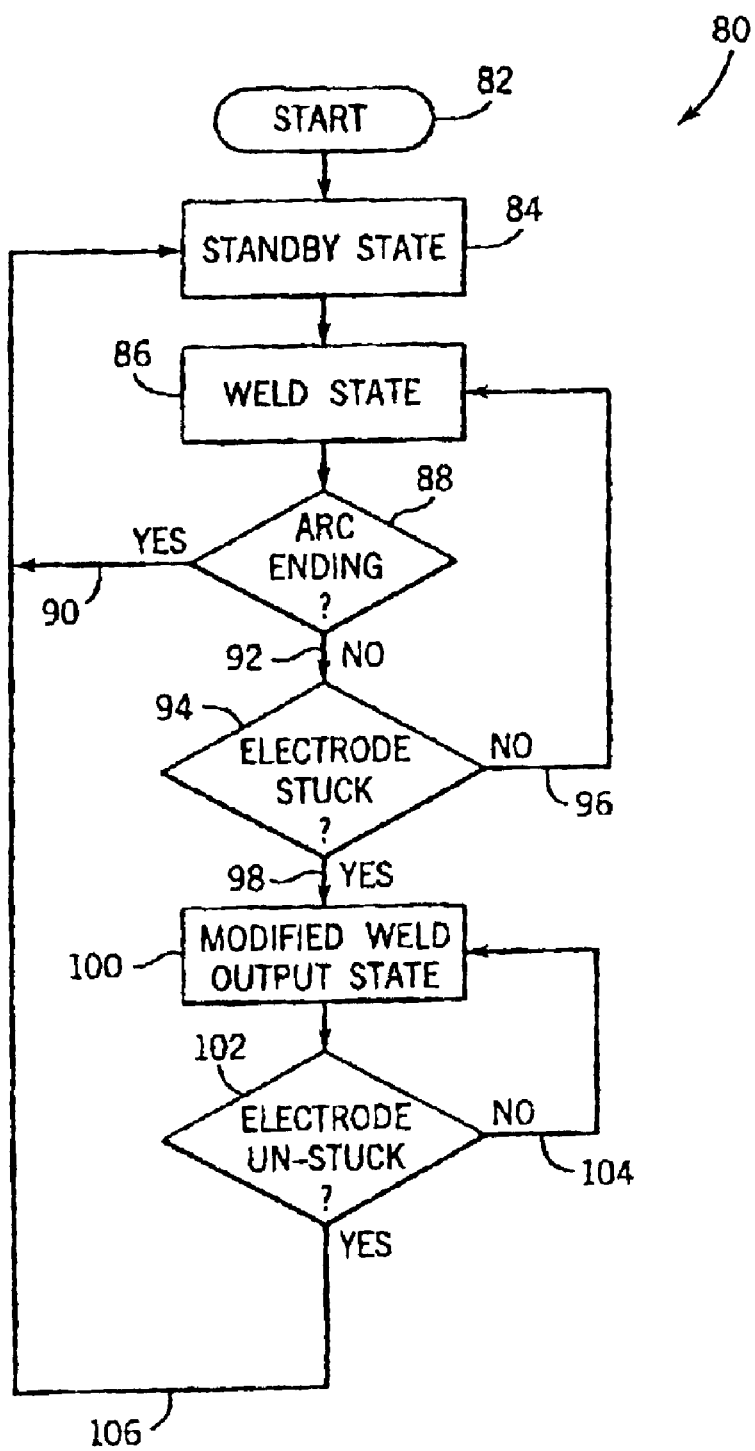
FIG. 4 is a flow chart setting forth the steps of a process of regulating a welding power source in accordance with an alternate embodiment of the present invention.

Referring now to FIG. 4, the steps of a process in accordance with an alternate embodiment of the present invention will be described. Specifically, process 80 begins at 82, and the welding power source is placed in a standby state at step 84. In the standby state 84, the power source awaits user input defining the desired weld output level and initiation of a welding state. Once the desired output level is defined and welding is initiated, the power source automatically goes to a weld output state and has an output that is at the weld level. The weld output level is maintained at the weld state 86 until an arc-ending signal is received. That is, at step 88, a determination is made as to whether the user desires to end the welding process. Specifically, if the user desires to end the welding process by removing the electrode from the weld 88, 90, the power source is returned to a standby state. However, if the user desires to maintain the welding process 88, 92, the controller for the power source then determines if a fused electrode condition has occurred at 94. If not 94, 96, the welding process is maintained and the output level of the power source is maintained in the welding state. However, if an electrode sticking condition signal is received 94, 98, the controller places the power source in a modified weld output state at 100.

The modified weld output state 100 is characterized by a maintaining of a welding output state but reduces of the output power down to a minimal level to maintain quick re-activation of the welding state. For example, the output level could be reduced to a current of one ampere. The minimal output level is the lowest output level maintainable by the power source without leaving the welding output state. That is, the welding output voltage is maintained but the current is significantly dropped.

The modified weld output state 100 is then maintained until an electrode unstuck condition signal is received. That is, at step 102, the power source controller determines if the electrode has unstuck by a user or technician. If not 102, 104, the process returns to step 100 and the modified weld output state is maintained. However, if the signal indicating that the sticking condition has been received 102, 106, the welding power source is returned to a standby state defined by a full output voltage level such that the welding process is ready to resume on demand.

Therefore, in accordance with one embodiment of the present invention, a welding power supply comprising a source of power and a controller connected to the source of power is provided. The power supply includes an output feedback circuit connected to the controller wherein the controller is configured to receive a signal indicative of an electrode sticking condition at a welding area and automatically reduce output of the source of power upon receipt of the signal.

In accordance with another embodiment of the present invention, a controller configured to regulate output of a welding power source is provided. The controller includes an output feedback circuit configured to provide a signal indicative of an output condition at a welding area and a control circuit connected to the output feedback circuit. The control circuit is configured to regulate output of the welding power source based on the signal provided by the output feedback circuit. The control circuit is further configured to automatically reduce the output of the welding power source upon receipt of an electrode sticking condition signal from the output feedback circuit.

In accordance with a further embodiment of the present invention, a computer readable storage medium having a computer program stored thereon to regulate a welding power source is provided. The computer program represents a set of instructions that when executed by a processor causes the processor to receive an input indicating an output condition at a welding area and determine from the input if an electrode is sticking in a weld at the welding area. If an electrode sticking condition is determined, the computer program causes the processor to automatically output a command signal to the welding power source to reduce power source output to a prescribed level until an input indicating an electrode un-sticking condition is received.

According to a further embodiment of the present invention, a welding power supply includes means for providing power suitable for welding and means for controlling the means for providing power connected to the means for providing power. The power supply further includes means for providing feedback of a welding area. The means for providing feedback is connected to the means for controlling. The welding power supply also includes means for reducing an output of the means for providing power based on reception of a signal from the means for providing feedback indicating an electrode sticking at the welding area.

The present invention has been described in terms of the preferred embodiment, and it is recognized that equivalents, alternatives, and modifications, aside from those expressly stated, are possible and within the scope of the appending claims.

What is claimed is:

1. A welding power supply comprising:
   a source of power;
   a controller connected to the source of power;
   an output feedback circuit connected to the controller; and
   wherein the controller is configured to receive a fault signal indicative of a fused electrode condition and automatically reduce an output of the source of power upon receipt of the fault signal.

2. The welding power supply of claim 1 wherein the controller is configured to reduce the output of the source of power to a minimum output level upon receipt of the fault signal.

3. The welding power supply of claim 2 wherein the minimum output level includes an output current of approximately one ampere.

4. The welding power supply of claim 1 wherein the controller is further configured to drive the source of power to have a non-welding output upon receipt of the fault signal.

5. The welding power supply of claim 4 wherein the controller is further configured to automatically drive the source of power to have a standby output upon receipt of an unstuck electrode condition signal.

6. The welding power supply of claim 1 configured to provide an early indication of a fused electrode in a stick welding process.

7. A controller configured to regulate output of a welding power source, the controller comprising:
   an output feedback circuit configured to provide a signal indicative of an output condition at a welding area;
   a control circuit connected to the output feedback circuit and configured to regulate output of a welding power source based on the signal provided by the output feedback circuit; and
   wherein the control circuit is further configured to automatically reduce the output of the welding power source upon receipt of a fused electrode condition signal.

8. The controller of claim 7 wherein the control circuit is further configured to automatically drive the welding power source to a standby state upon receipt of an electrode un-stuck condition signal from the output feedback circuit.

9. The controller of claim 8 wherein the control circuit is further configured to reduce the output of the welding power source to a minimum welding output upon receipt of the electrode stuck condition signal.

10. The controller of claim 9 wherein the minimum welding output is that necessary to initiate welding upon demand without a restart.

11. The controller of claim 7 wherein the control circuit is further configured to drive the welding power source to have a non-weld output upon receipt of the fused electrode condition signal.

12. The controller of claim 7 incorporated into a stick welding system.

13. A computer readable storage medium having a computer program stored thereon to regulate a welding power source, the computer program indicating a set of instructions that when executed by a processor causes the processor to:
   receive an input indicating a welding output condition of a welding operation;
   determine from the input if an electrode is stuck in a weld; and
   if an electrode sticking condition is determined, automatically output a command signal to the welding power source to reduce power source output to a prescribed level until an input indicating an electrode unstuck condition is received.

14. The computer readable storage medium of claim 13 wherein the prescribed level includes a minimum welding output.

15. The computer readable storage medium of claim 14 wherein the minimum welding output includes an output current necessary to quickly increase power source output.

16. The computer readable storage medium of claim 13 wherein the prescribed level includes a non-welding, standby output.

17. The computer readable storage medium of claim 16 wherein the set of instructions further causes the processor to prevent a return to a welding output until an open circuit input is received.

18. A welding power supply comprising:
   means for providing power suitable for welding;
   means for controlling the means for providing power;
   means for providing feedback of a welding area; and
   wherein the means for controlling includes means for reducing an output of the means for providing power based on reception of a signal from the means for providing feedback indicating a fused electrode at the welding area.

19. The welding power supply of claim 18 wherein the means for controlling further includes means for maintaining the reduced output until reception of a signal from the means for providing feedback indicating an electrode un-sticking at the welding area.

20. The welding power supply of claim 18 wherein the means for reducing includes means for lowering the output of the means for providing power to have a current needed to quickly restart welding.

* * * * *